May 11, 1943. R. TEMPLE 2,318,724
APPARATUS FOR TESTING PRESSURE GAUGES
Filed Oct. 19, 1940 2 Sheets-Sheet 1

INVENTOR.
ROBERT TEMPLE
BY
Frank E. Foote
ATTORNEY.

May 11, 1943.  R. TEMPLE  2,318,724
APPARATUS FOR TESTING PRESSURE GAUGES
Filed Oct. 19, 1940  2 Sheets-Sheet 2

INVENTOR.
ROBERT TEMPLE
BY Frank E. Foote
ATTORNEY.

Patented May 11, 1943

2,318,724

UNITED STATES PATENT OFFICE 2,318,724

APPARATUS FOR TESTING PRESSURE GAUGES

Robert Temple, Swissvale, Pa., assignor, by mesne assignments, to Temple Velocity Equipment, Inc., a corporation of Delaware Application October 19, 1940, Serial No. 361,921

7 Claims. (Cl. 73—51)

This invention relates to a gauge testing apparatus and more particularly to an apparatus adaptable to subject a pressure gauge to an extreme impulse or surge condition such as may be encountered in the use of a gauge operable at high pressures.

Heretofore in the testing of pressure gauges which contain a mechanical pressure responsive element such as a Bourdon tube, diaphragm or bellows, the testing apparatus has been useful merely to check the accuracy of the gauge itself. In the case of the use of gauges to be subjected to relatively high pressures, such as those to indicate the pressure existing in an oxygen container for breathing purposes which when filled contains a fluid pressure of several thousand pounds, the responsive element may be subjected instantly to this maximum pressure by instantly opening the outlet valve and the effect of this opening is a surge or impulse condition which is not duplicated in any pressure tests to which the gauge has been heretofore subjected and which condition has frequently resulted in the failure of a pressure gauge. This failure has caused severe consequences on many occasions because of the lack of a replaceable apparatus and the absolute need for purposes of respiration to have some pressure indicating means and the hazards of a sudden release of a high pressure.

It is among the objects of this invention to provide an apparatus which is adaptable to subject a pressure gauge to an extreme impulse or surge pressure condition such as may be created in an instantaneous application of high pressure to the responsive element of a gauge.

A more specific object of this invention is to provide an apparatus which is adaptable for subjecting a gauge to an extreme surge or impulse test and which is operative to record this condition, which is simple and inexpensive to operate, inexpensive to manufacture, portable, and which is adaptable to accommodate the many types of pressure gauges available.

Other objects of this invention will become apparent from a description of what I now consider to be a preferred embodiment of the invention which is illustrated in the drawings in which.

Figure 1:
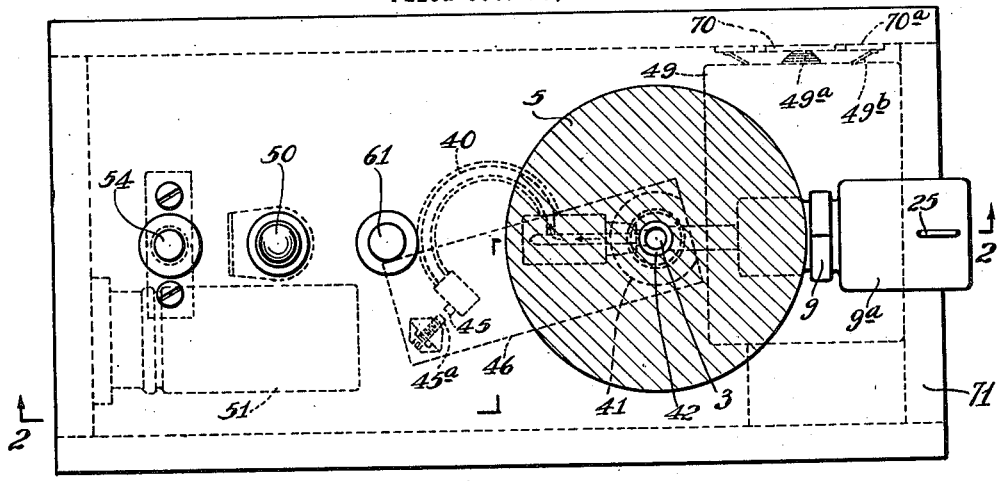
Fig. 1 is a plan view partly in section taken along the line 1—1 of Fig. 2 and with the wiring omitted for the purpose of simplicity.
Figure 2:
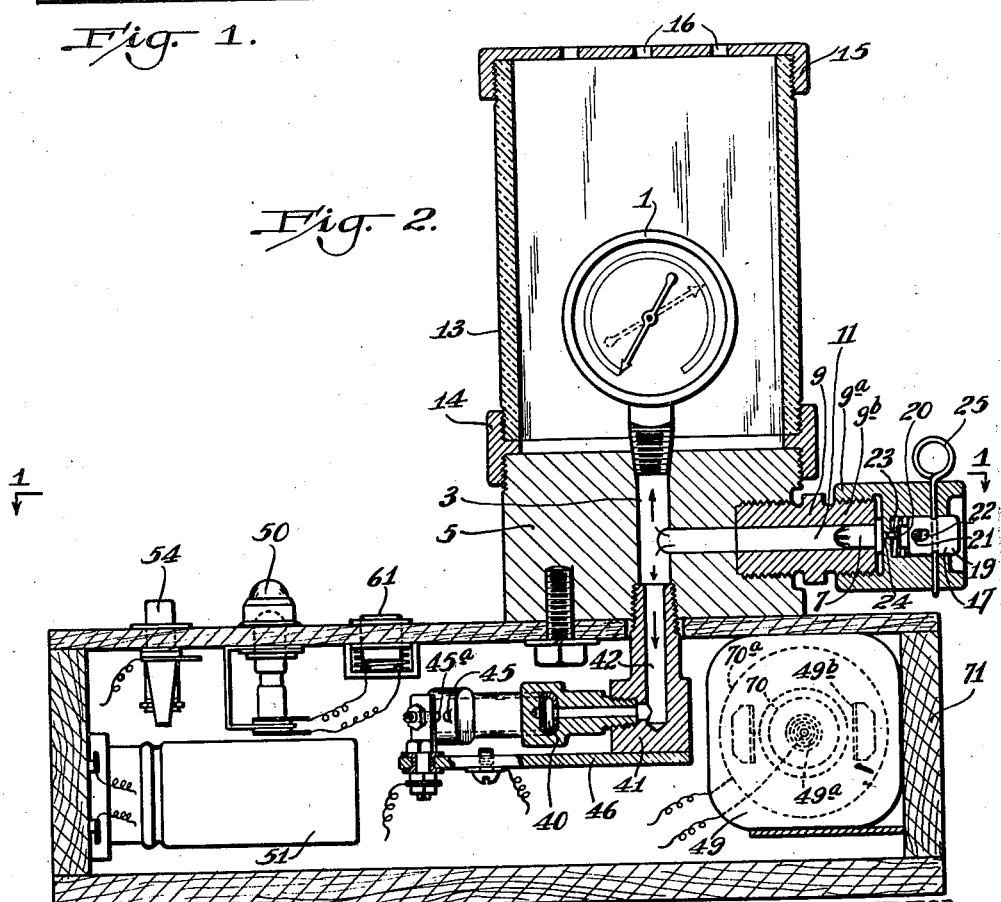
Fig. 2 is a sectional view taken along the line 2—2 of Fig. 1.
Figure 3:
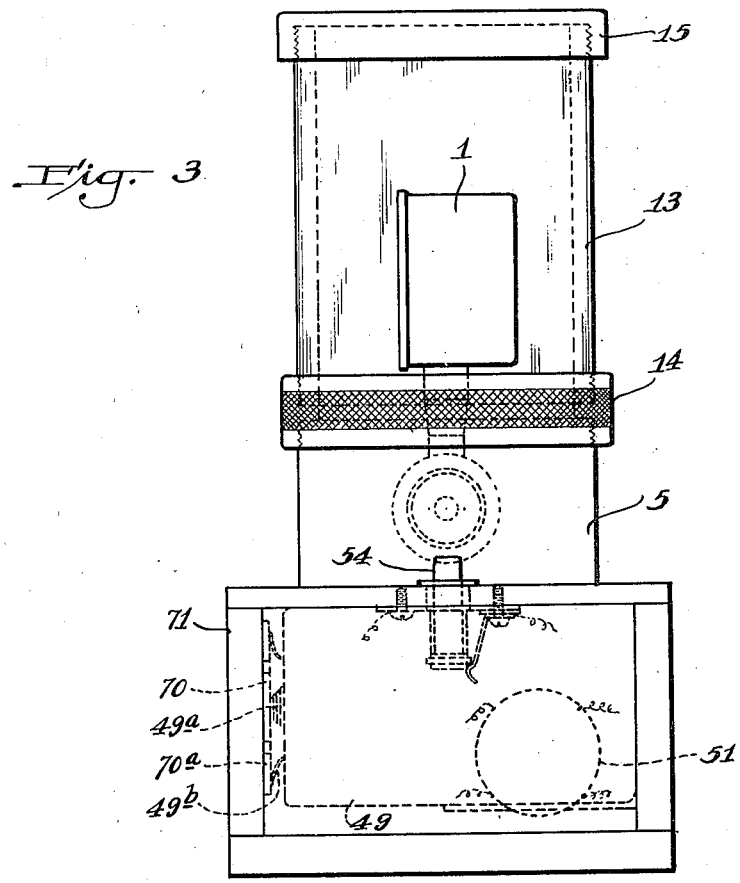
Fig. 3 is an end elevation of the same embodiment.

Because of the hazards existing in the use of a pressure gauge which may be subjected instantly to the pressure of several thousand pounds, such as the use of a gauge connected to the outlet of an oxygen tank or container used for the purpose of respiration or welding, it has been desired to provide some test or means to which the gauges could be subjected in order to determine their ability to withstand such an extreme condition of surge or impulse.

It has been found that by subjecting the pressure responsive element of a gauge to an explosion of a confined explosive charge that a sufficiently high pressure is instantly imposed on the element to reproduce this most extreme condition of surge or impulse. The inlet of the gauge to be tested is connected to a confined chamber in which an explosive charge can be disposed and set off. Due to the confinement of the charge and the limited volume, the force of the explosion which is almost instantaneous is applied to the responsive element and the resulting pressure produced should be approximately that of the upper pressure limit of the gauge, and the manner of application of the pressure adequately tests the instrument against the most severe condition which may be imposed on the apparatus during its service life. The extent of the charge used will depend upon the size of the responsive element in the gauge and also the range of the gauge itself. In the case of high pressure gauges of a small size, the volume involved is small and it is necessary only to subject the gauge to a charge of a few grains of gun powder as used in ordinary cartridges. In the event that some recording is desired of the condition formed and which is a feature of this invention, the charge depends to some extent upon the responsive element used in the device. In the apparatus illustrated in the drawings, a charge of about four grains of gun powder is sufficient to test a three thousand pound gauge.

By the use of this method of testing which requires only a few minutes of time, it is now possible to reproduce without much expense a pressure condition that will determine whether the gauge is ready for use. Subsequently, the gauge can be then tested for accuracy by the use of an apparatus such as a dead weight tester, but it has been found that the effect of the surge test is not too serve to alter any setting of adjustment for accuracy, and if some alteration occurs it is quite probable that some repair is necessary and thus discloses a condition in recording normal pressures which would otherwise go unnoticed.

A problem was encountered in providing a device for recording or visibly indicating the pressure condition created by the explosion of the explosive charge because the maintenance of this pressure is of almost instantaneous duration. It is almost physically impossible to observe the pressure from the movement of the indicator of the gauge and this condition is so extreme that many times the indicator is disengaged from the responsive element.

Referring to the drawings, a gauge 1 to be tested is mounted onto a support 5 which contains a passage 3 to which the inlet of the gauge is connected. Into this passage is to be inserted a cartridge 7 and a means to confine the explosion of the charge within the passage. For practical reasons, a separate cartridge carrying and closure member 9 is mounted onto the support and it has an opening 11 connected to the passage 3 of the support.

A firing pin 17 is mounted into the cartridge carrying and closure member 9 and is supported directly by a cap portion 9a which is threaded to the cartridge support 9b and this is threaded to the gauge support 5. This firing pin is composed of an impact member 19 which engages a pin 20. The pin is mounted into the impact member and has a lateral extension 21 that passes through an aperture 22 of the impact member and engages the outward edge of the aperture to move the pin into engagement with the head of the cartridge through the opening 24 in the cap. For the purpose of protection, a spring 23 holds the impact member and the integral firing pin in a withdrawn position. A safety element 25 passes through an opening in the cap and the impact member and must be withdrawn before the impact member may be moved into engagement with the cartridge. In operation, by setting off the cartridge 7, an instantaneous pressure is formed in the passages 11 and 3 and subjects the responsive element of the gauge to a pressure approximately that of the maximum pressure of the gauge and which is formed in part by an impulse or surge action formed by the instantaneous application of pressure. The size of cartridge selected must be adaptable to subject the gauge to a resulting pressure comparable substantially to the maximum in order to get the benefits acquired by performing the test.

A suitable cartridge for testing a three thousand pound gauge having about a three inch face is a 32 calibre cartridge case containing about four grains of powder which can be the regular powder used for pistol arms. One commercial powder is a "Hercules Bullseye" pistol powder which is a fast-burning powder containing about 40% nitroglycerine. The case is suitably crimped at the pressure ejecting end and is also sealed with a non-grease like seal in order to prevent any objectionable burned grease formation in the passage 3 of the apparatus.

A transparent housing 13 is mounted on the support 5 by a coupling member 14. This transparent housing may be any suitable plastic material such as a cellulose derivative or a phenolic resinous material and the upper extent is closed by means of a cap 15 having apertures 16 therein to relieve any pressure that may be formed within the housing. This housing is provided for the purpose of protection against high pressures in the event of rupture of the gauge.

Figure 4:
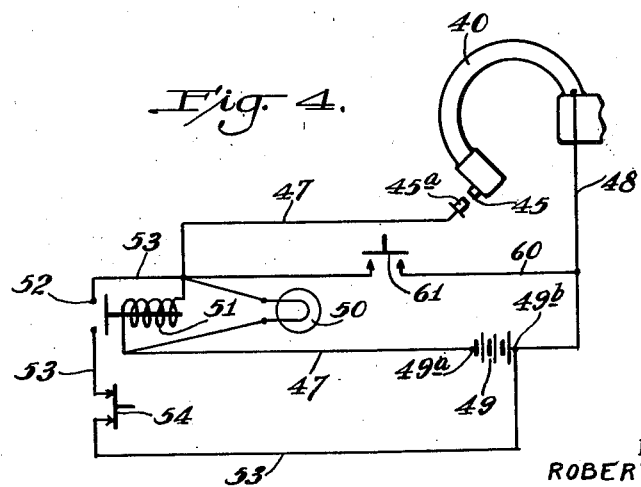
Fig. 4 is a wiring diagram of the electrical circuit incorporated in the apparatus.

For the purpose of providing some means of recording the instant pressure condition to which the gauge is subjected, an electrical apparatus is provided. Connected to the passage 3 in which the explosive charge is discharged is another responsive element 40 which in this instance is illustrated as a Bourdon tube. This tube is supported onto the gauge support by means of an L-shaped fitting 41 which has a central passage 42 directly connecting the passage of the tube 40 to the passage 3 in which the explosion occurs. The style and size of responsive element used must be such to withstand the pressures involved and preferably it should be a little larger than the element in the gauge being tested and heavier in construction. The responsive element 40 carries a contact 45 which is engageable with a contact 45a that is supported onto an extension 46 carried by the fitting 41. This contact 45a is connected to conductor 47, Fig. 4, while contact 45 is connected to conductor 48 through the responsive element itself. It may be preferred to connect the conductor directly to the contact 45 rather than include the tube as part of the circuit.

Upon the application of sufficient pressure to the tube, contacts 45 and 45a are closed, and this in turn closes a circuit to a battery 49 and in which is interposed a lamp 50. These contacts control the making of an electrical circuit to a battery 49 through the conductors 47 and 48. In conductor 47 is placed a lamp 50 and in parallel relation the coil of a relay switch 51. A second circuit connecting the lamp 50 to the battery 49 is formed by conductor 53 and the closure of contacts 52 interrupting the circuit to the battery and controlled by energization of the coil through the main circuit. Likewise, energization of the relay 51 is continued through the second circuit. A normally closed push button 54 is placed in the conductor to interrupt the energization of the relay and lamp by opening the second circuit to restore the electrical circuit to a normal position. For the purpose of check a circuit parallel to the contacts 45 and 45a of the Bourdon tube is provided by connecting conductor 60 to conductors 47 and 48 and is controlled by a normally open push button 61 which upon being closed produces the same sequence of operation as closure of contacts 45 and 45a of the tube.

Thus upon explosion of a cartridge the pressure formed in the passage 3 is imposed on the responsive element of the gauge 1 being tested and the responsive element 40 which if sufficient causes the closure of contacts 45 and 45a, and this in turn closes the main circuit of conductors 47 and 48, the lamp 50, the relay 51 and the battery 49. Energizing the relay 51 closes contacts 52 and forms a second circuit to the battery through the conductor 53 which continues energization of the lamp and relay upon opening of the contacts 45 and 45a by dissipation of pressure of explosion in the passage 3. Energization continues until opening of the push button 54.

The battery 49 is installed in the circuit by its contacts 49a and 49b engaging fixed contacts 70 and 70a attached to a boxlike structure 71. This structure forms a support for the several elements employed in the electrical circuit and also forms a support on which the metal support 5 for the gauge is mounted. The contact 45a which cooperates with contact 45 to close the main circuit is preferably an adjustable one to accommodate the pressure desired to be visibly recorded by the electrical device. By varying the size of cartridge and adjusting the contact 45a, any size of gauge can be tested of within the limits of the responsive element 40. However, this element can be readily replaced so that the whole apparatus is adjustable to test any type or style of pressure gauge of the general type considered.

With this apparatus a test of the pressure instrument can be provided which is considerably more extreme than any test heretofore accomplished by the application of substantially static pressure to the responsive element of the instrument. This surge or impulse condition is a condition frequently formed by the quick opening of a valve which controls a relatively large pressure. The flow of fluid at such a difference in pressure many times ruptures the instrument and in some instances causes great injury. By the use of a test such as provided by this invention, the durability of the apparatus can be tested to determine whether it is able to withstand these conditions which are most applicable for gauges operative at high pressures.

While the embodiment illustrated is what I now consider to be the preferred embodiment of my invention and which illustrates the principle involved, I intend that the invention be limited only by the scope of the appended claims.

I claim:

1. A gauge testing apparatus comprising a means adaptable to receive and detonate a confined explosive charge and having a pasage to be connected to the inlet of a gauge to be tested, the passage having a minimum volume so that the impulse or surge effect of confined rapid expansion of gases is transferred to the gauge, and an indicating means connected to the means to record the maximum pressure condition including the impulse or surge effect to which the gauge is subjected comprising a pressure responsive means connected to the passage and an electrical indicator energized by action of the responsive means.

2. A gauge testing apparatus comprising a support for a gauge to be tested and having a bore of minimum volume so that the impulse or surge effect of rapid expansion of gases is transferred to the gauge and connected to the inlet of the gauge and adaptable to receive a confined explosive charge, a firing means and an indicating means responsive to the explosion of a charge comprising a pressure responsive means connected to the bore, a main electrical circuit, a source of power connected to the circuit, a normally open interrupting means in the circuit closed by movement of the responsive means, and an indicating means energized by closure of the interrupting means.

3. A gauge testing apparatus comprising a support for a gauge to be tested and having a bore connected to the inlet of the gauge and adaptable to receive a confined explosive charge, a firing means, and an indicating means responsive to the explosion of the charge whereby an intended extreme pressure condition is recorded comprising a pressure responsive means connected to the bore, a main electrical circuit, a source of power connected to the circuit, a normally open interrupting means in the circuit closed by movement of the responsive means, an indicating means energized by closure of the interrupting means, a holding circuit means connected to the indicating means to continue energization of the indicating means upon opening of the interrupting means in the main circuit and a manual means in the holding circuit means to interrupt the energization of the indicating means.

4. A gauge testing apparatus comprising a support for a gauge to be tested and having a bore connected to the inlet of the gauge and adaptable to receive an explosive charge, a firing means, and an indicating means responsive to the explosion of the charge whereby an intended pressure condition is recorded comprising a pressure responsive means connected to the bore, a main electrical circuit, a source of power connected to the circuit, a normally open interrupting means in the circuit closed by movement of the responsive means, an adjustment means to vary the extent of movement of the responsive means to close the interrupting means, an indicating means energized by closure of the interrupting means, a holding circuit means connected to the indicating means to continue energization of the indicating means upon opening of the interrupting means in the main circuit and a manual means in the holding circuit means to interrupt the energization of the indicating means.

5. A gauge testing apparatus comprising a support for a gauge to be tested and having an opening, a member having a bore connected to the opening of the support and adaptable to receive an explosive charge of a size depending on the pressure responsive element of the gauge and capable of subjecting the gauge to a predetermined pressure, a firing means, and a pressure responsive means adaptable to record an instantaneous extreme pressure condition comprising a pressure responsive means connected to the bore and having a predetermined relation to the responsive element of the gauge, an electrical circuit arranged to be connected to a source of power, a normally open interrupting means in the circuit and operated by movement of the responsive means, a visible indicating means in the circuit and energized by closure of the interrupting means, a holding circuit means to continue energization of the indicating means upon opening of the interrupting means in the circuit and a manual means in the holding circuit means to interrupt the energization of the indicating means.

6. A gauge testing apparatus comprising a support for a gauge to be tested and having an opening, a member having a bore connected to the opening of the support and adaptable to receive an explosive charge of a size depending on the pressure responsive element of the gauge and capable of subjecting the gauge to a predetermined pressure, a firing means, and a pressure responsive visible indicating means whereby a desired extreme pressure condition is recorded comprising a pressure responsive means connected to the bore and having a predetermined relation to the responsive element of the gauge, a source of power, an electrical circuit connected to the source of power, a normally open interrupting means in the circuit and operated by movement of the responsive means, a visible indicating means in the circuit energized by closure of the interrupting means, a secondary circuit means connected to the source of power, a normally open interrupting means in the secondary circuit, a relay means in the main circuit operable to close the interrupting means of the secondary circuit and to continue energization of the indicating means upon opening of the interrupting means in the main circuit and a manual means in the secondary circuit means to interrupt the energization of the indicating means.

7. A gauge testing apparatus comprising a means adaptable to receive and detonate a confined explosive charge and having a passage to be connected to the inlet of a gauge to be tested, the passage being of a size so that the surge or impulse effect of rapidly expanding gases from the explosion of an explosive charge is transferred to the gauge and a pressure responsive means connected to the passage to record the maximum pressure condition to which the gauge is subjected.

ROBERT TEMPLE.